Dec. 3, 1968   F. K. MÖLLRING   3,414,345
ILLUMINATION DEVICE FOR MICROSCOPES
Filed March 18, 1965   3 Sheets-Sheet 1

INVENTOR:
Friedrich Karl Möllring
BY Singer, Stern & Carlberg
Attorneys

Dec. 3, 1968  F. K. MÖLLRING  3,414,345
ILLUMINATION DEVICE FOR MICROSCOPES
Filed March 18, 1965  3 Sheets-Sheet 2

INVENTOR:
Friedrich Karl Möllring
BY Singer, Stern & Carlberg
Attorneys.

Dec. 3, 1968   F. K. MÖLLRING   3,414,345
ILLUMINATION DEVICE FOR MICROSCOPES
Filed March 18, 1965   3 Sheets-Sheet 3

INVENTOR.
Friedrich Karl Möllring
BY Singer, Stern & Carlberg
Attorneys

United States Patent Office 3,414,345
Patented Dec. 3, 1968

3,414,345
ILLUMINATION DEVICE FOR MICROSCOPES
Friedrich Karl Möllring, Aalen, Wurttemberg, Germany, assignor to Carl-Zeiss-Stiftung, doing business as Carl Zeiss, Heidenheim on the Brenz, Wurttemberg, Germany, a corporation of Germany
Filed Mar. 18, 1965, Ser. No. 440,816
Claims priority, application Germany, Mar. 21, 1964, Z 10,722
4 Claims. (Cl. 350—87)

ABSTRACT OF THE DISCLOSURE

An illumination device for a microscope in which a continuous adjustment of the light intensity and also a continuous homogenization of the illumination of the luminous area is possible.

Figure 1:
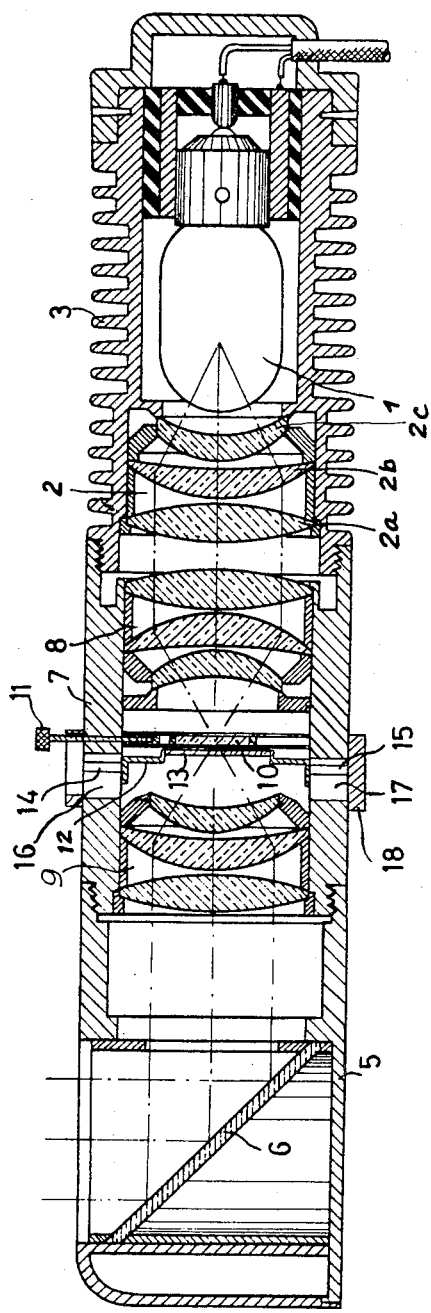

The illumination device contains optical elements which form an intermediate image of the light source. Gray sky filter means are arranged displaceable at right angles to the optical axis of said illumination device immediately adjacent said intermediate image for adjusting the intensity of the light emitted by said light source and light dispersion second means are also arranged immediately adjacent said intermediate image and are displaceable in the direction of the optical axis of said device for homogenizing the illumination of the luminous area.

The invention relates to improvements in illumination devices for microscopes, particularly such type of illumination devices which employ a gas discharge lamp as a source of light. In such illumination devices it is necessary to be able to adjust the light intensity and also the homogenization of the luminous area requires to be adjusted.

An adjustment of the light intensity is possible when an incandescent lamp is used as a source of light, because this is accomplished by a voltage or current adjustment. An adjustment of the light intensity of a gas discharge lamp, however, is more difficult and sometimes impossible. It is customary to employ filters for the adjustment of the light intensity in gas discharge lamps and arranging these filters in the path of the light beam. The diameter of these filters depend upon the diameter of the entrance pupil of the microscope and is usually about 20 millimeters. Such a known device therefore has the disadvantage that relatively large filters are required and another disadvantage is that a continuous adjustment of the light intensity is not possible.

An object of the invention is an illumination device for microscopes in which without employing expensive and cumbersome parts a continuous adjustment of the light intensity and also a homogenization of the luminous area is possible.

In accordance with the invention the illumination device for microscopes comprises a source of light, associated with a condenser, a lens system, which produces an intermediate image of the source of light and means disposed immediately adjacent the plane of said intermediate image for adjusting the light intensity and/or means for homogenizing the luminous area.

According to the invention the means for adjusting the light intensity and for homogenizing the luminous area are arranged at or near the place where an intermediate image of the source of light is produced; this is a place where the diameter of the beam of light of the source of light is very small. Accordingly, the diameter required for the mentioned means is also very small, so that the device of the invention compared with the prior art devices, will require less space, is simple and therefore also less expensive.

In accordance with another object of the invention the means for adjusting the light intensity comprise a gray sky filter which is adjustable in a direction at right angles to the optical axis of the illumination device. This gray sky filter is arranged at approximately the place where the intermediate image of the source of light is produced. Since the diameter of the beam of light is very small at this particular place the required gray sky filter is also very small, while its light-transmission difference per unit length may be selected relatively great.

In accordance with still another object of the invention the means for adjusting the light intensity comprise a pair of gray sky filters in which the two filters are arranged to be adjusted simultaneously to one another in opposite directions. This type of means is preferably employed when the adjustment of the light intensity is very critical.

Still another object of the invention is to employ as means for homogenizing the luminous area a dispersion disc which is disposed adjacent said gray sky filter and is arranged axially adjustable along the optical axis of the illumination device away and toward said gray sky filter. If the dispersion disc is arranged directly in the plane of said intermediate image of the source of light it may be used to influence the direction dependency of the light intensity while its homogenizing effect in this position would theoretically be equal to zero. A displacement of the dispersion disc along the optical axis and away from the intermediate image, however, increases the homogenizing effect more and more. It is, therefore, of advantage, to make the dispersion disc adjustable along the optical axis of the illumination device, since in this manner a continuous adjustment of the degree of homogenization is possible.

In view of the smallness of the required diameter of the dispersion disc it is possible to employ in the illumination device of the invention a dispersion disc with a gradually progressing grain structure. Such a modified dispersion disc, according to another object of the invention is additionally adjusted in a direction at right angles to the optical axis of the illumination device.

Both mentioned arrangements of the dispersion discs permit a selection of a compromise adjustment between a possible smallest light intensity reduction and a just sufficient homogenization of the luminous area.

Figure 2:
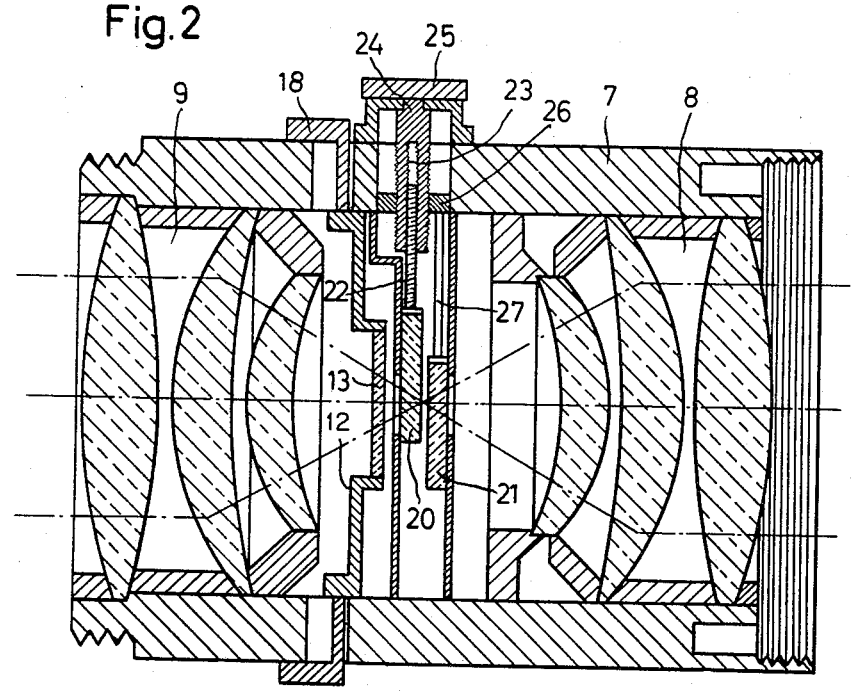
Figure 3:
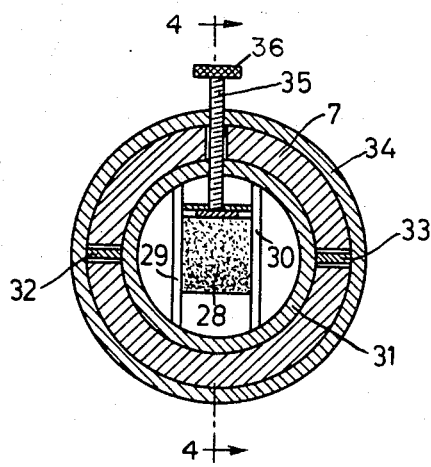
Figure 4:
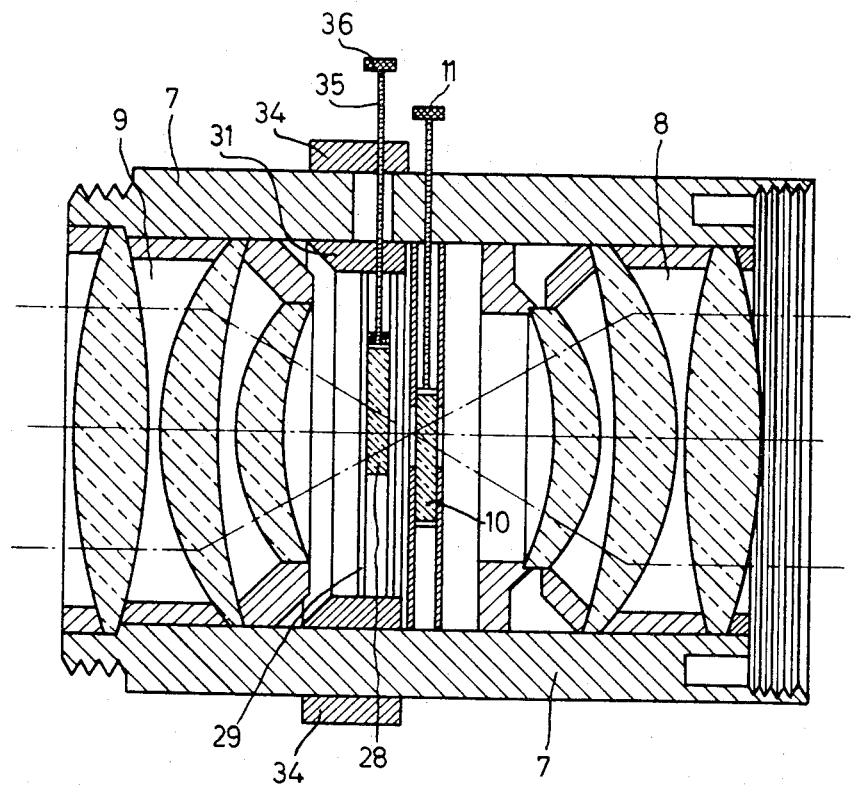

With these and other objects in view the invention will now be described with reference to the accompanying drawings, in which:

FIG. 1 illustrates, by way of example, an axial sectional view of an illumination device for a microscope taken along the optical axis of the device, FIG. 2 illustrates a modified construction of the light intensity filter, namely a pair of gray sky filters, FIG. 3 illustrates in a cross-sectional view a modified arrangement and construction of the light dispersion means, and FIG. 4 is a sectional view along the line 4—4 of FIG. 3.

FIGURE 1 illustrates, by way of example, in a longitudinal sectional view one embodiment of an illumination device of the invention. One end of the device is formed by an air-cooled housing 3 with conventionally cooling fins or ribs which has mounted therein a source of light 1, comprising for instance a gas discharge lamp, and a condenser lens system 2 composed of a bi-convex lens 2a and two convexo-concave lenses 2b and 2c, all arranged in axially spaced relation, with the outermost convexo-concave lens facing the source of light 1 with its concave surface. The condenser lens system 2 projects by means of the inclined mirror 6 arranged in a housing portion 5 at the other end of the device the source of light into the entrance pupil of a not illustrated microscope.

Another housing portion 7 of the tubular form is arranged between the lamp and condenser housing 3 and the end housing portion 5 and contains two similar axially alined lens systems 8 and 9. These lens systems comprise each a bi-convex lens and two convexo-concave lenses all in axially spaced alignment and with the outermost concave lens surfaces of the two lens systems facing each other. The two lens systems 8 and 9 are arranged as an afocal system and produce in their common focal plane an intermediate image of the source of light 1 in approximate natural size and furthermore they project this intermediate image into the entrance pupil of the microscope.

In the plane of the intermediate image is arranged a gray sky filter 10 which by means of an adjusting screw 11 extending radially outwardly of the housing portion 7 may be adjusted at right angles to the optical axis of the illuminating device. This gray sky filter 10 is employed for adjusting the illumination intensity by a rotative movement of the screw 11.

When looking into the direction of the light, namely from the right hand end of the figure toward the left hand end, there is arranged in rear of the gray sky filter 10 a dispersion disc 13 in a mount 12. The dispersion disc 13 is employed for homogenizing the luminous area of the light source 1. The mount 12 is in slidable engagement with the inner cylindrical wall of the housing portion 7 and has two diametrically opposed radially outwardly extending projections 14 and 15 which pass through axially extending slots 16 and 17 in the housing portion 7. The projections 14 and 15 are connected to a ring 18 which is mounted axially slidable on the outer surface of the housing portion 7. Upon an axially slidable adjustment of the ring 18 the dispersion disc 13 is moved axially along the optical axis of the illuminating device, so that a continuous adjustment of the degree of homogenization of the luminous area is possible.

In place of the gray sky filter 10 one may also employ a pair of gray sky filters as shown in FIG. 2. The adjustment of the light intensity in such a modified arrangement is accomplished by two gray sky filters 20 and 21.

The filter 20 is fixedly attached to a radially extending rod 22 the outer end of which is provided with an exterior thread engaging an interior thread 23 of a tubular member 24 which is provided with a knob 25 for rotation. Since the member 24 is secured against axial movement a rotation of the same will cause a radial adjustment of the filter 20, either outwardly or inwardly, depending upon the direction of rotation of the knob 25.

The tubular member 24 is also provided with an exterior thread which engages the interior thread of a nut 26 which is non-rotatably mounted. This nut 26 is attached to a rod 27 extending parallel to the rod 22 and is fixedly attached to the other filter 21 of the pair of filters 20, 21. Therefore, a rotation of the tubular member 24 will also effect a radial displacement of the filter 21. The arrangement is such that upon rotation of the tubular member 24 by means of the knob 25 the filters 20 and 21 are simultaneously displaced the same distance in opposed radial directions. Therefore, the knob 25 is used for controlling the intensity of light.

In FIG. 3 is illustrated a modified light dispersion disc 28 which is provided with a gradually progressing grain structure. The disc 28 is rectangular and is mounted in two spaced parallel lateral guides 29 and 30 extending parallel to a radially extending screw spindle 35 projecting with its outer end from the mount 34 and having an operating knob 36 thereon, while the inner end of the spindle is connected with the dispersion disc 28. The two parallel guides 29 and 30 are fixedly mounted in a ring 31 which is arranged concentrically about the optical axis of the illuminating device and axially slidably engages the inner wall of the housing portion 7 (FIG. 4). The ring 31 is connected by two diametrically opposed guide members 32, 33 with another ring 34 which slidably surrounds the circular housing portion 7. The spindle 35 is in threaded engagement with threaded bores in the walls of the rings 31 and 34. A rotation of the threaded spindle 35 causes a radial adjustment of the dispersion disc 28 either inwardly or outwardly, while an axial displacement of the ring 34 effects an adjustment of the disc 28 along the optical axis of the circular housing portion 7.

What I claim is:

1. In combination with a microscope comprising a housing, a source of light having an inhomogeneous luminous area, a condenser lens system through which the light produced by said source of light is caused to pass, a first and a second lens system arranged as an afocal system in axial alignment with said condenser lens system so that an intermediate image of said source of light is formed by the combined action of said condenser and said first lens system in the common focal plane of said two lens systems, another image of said intermediate image being formed by the second lens system at infinity, a first adjustable filter means comprising a gray sky filter arranged immediately adjacent said intermediate image and displaceable at right angles to the common optical axis of said two lens systems for varying the light intensity of said image, a second adjustable filter means comprising a dispersion disc cooperating with said first filter means and arranged immediately adjacent said intermediate image and displaceable in the direction of the optical axis of said two lens systems for varying the illumination homogeneity of the luminous area of said intermediate image, and means on said housing for adjusting said first and second filter means.

2. An illumination device for a microscope according to claim 1, in which said first filter means comprises a pair of gray sky filters, and means for adjusting said filters simultaneously in opposed radial directions at right angles to said common optical axis.

3. An illumination device for a microscope according to claim 2, in which said second filter means comprising said dispersion disc is arranged with its plane at right angles to said optical axis.

4. An illumination device for a microscope according to claim 12, in which said dispersion disc has a grain structure gradually changing in a direction at right angles to said optical axis, means for adjusting said disc in said direction in which the grain structure changes, and means for additionally adjusting said dispersion disc in the direction of said optical axis.

References Cited

UNITED STATES PATENTS

| | | | |
|---|---|---|---|
| 2,959,097 | 11/1960 | Mollring | 350—87 |
| 1,709,762 | 4/1929 | Zworykin | 350—160 |
| 1,800,044 | 4/1931 | Baird | 350—160 |
| 1,995,599 | 3/1935 | Bauersfeld | 350—87 |
| 2,427,689 | 9/1947 | Osterberg et al. | |
| 2,404,888 | 7/1946 | Richards | 350—89 |

FOREIGN PATENTS 369,294  6/1963  Switzerland.

DAVID SCHONBERG, *Primary Examiner.*

P. R. GILLIAM, *Assistant Examiner.*